US000001284H

United States Statutory Invention Registration [19]

[11] Reg. Number: H1284

Castro

[43] Published: Feb. 1, 1994

[54] COATING PROCESS

[75] Inventor: Cesar O. Castro, Houston, Tex.

[73] Assignee: Shell Oil Co., Houston, Tex.

[21] Appl. No.: 883,514

[22] Filed: May 15, 1992

Related U.S. Application Data

[63] Continuation of Ser. No. 636,060, Dec. 31, 1990, abandoned.

[51] Int. Cl.[5] ..... B05D 1/08

[52] U.S. Cl. ..... 427/447

*Primary Examiner*—Shean Wu

*Attorney, Agent, or Firm*—Peter A. Bielinski; D. F. Vance

[57] ABSTRACT

A coated object is produced by flame spraying the object with a substantially molten polymeric material which comprises a blend containing polybutylene homopolymer or copolymer, an adhesion promoter and a nucleating agent.

14 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

COATING PROCESS

This is a continuation of application Ser. No. 636,060, filed Dec. 31, 1990, now abandoned.

FIELD OF THE INVENTION

This invention relates to a process for coating an object with polybutylene homopolymer or copolymer. More particularly, the invention relates to a flame spraying process for coating a solid object with polymeric material comprising polybutylene homopolymer or copolymer, an adhesion promoter and a nucleating agent.

BACKGROUND OF THE INVENTION

Polybutylene homopolymers and copolymers are well known in the art and are shaped and/or formed by a variety of conventional techniques such as extrusion or injection molding into objects of known utility. For other purposes, it would be of advantage to coat objects with a coating of the polymer. Such coatings provide, for example, corrosion or abrasion resistance or as a tie layer for bonding other polymers to a substrate which may not adhere well.

In one application, polished aluminum is coated with a thin uniform layer of polybutylene. The coating is applied such that in certain areas the coating can be removed forming a mask which is used to selectively chemically etch the aluminum as necessary for the manufacture of certain articles e.g. aircraft wing surfaces.

In the past, on highly polished surfaces, polybutylene coatings would delaminate within 4 to 6 hours from coating.

A method was needed to coat polished aluminum so that the coating would not delaminate and so that etching could be completed. After etching, it is then desirable to be able to remove the coated polybutylene mask with a minimum amount of work.

Applicants have found that by incorporating a nucleating agent into the polybutylene coating composition, coatings can be produced which do not delaminate for 24 to 96 hours. The coating has good adhesion even to polished aluminum and can be easily removed after 24–96 hours.

SUMMARY OF THE INVENTION

The present invention relates to a process for coating objects with a polybutylene homopolymer or copolymer and to the coated objects thereby produced. More particularly, the present invention relates to a process for flame spray coating an object with polybutylene homopolymer or copolymer composition. The composition comprises polybutylene, an adhesion promotor and a nucleating agent. The invention also relates to the coated objects thereby produced.

DESCRIPTION OF THE INVENTION

The polymeric material employed to flame spray coat objects according to the process of the invention is an isotactic polybutylene optionally blended with tackifying resins.

A use for this flame coating technique is to provide corrosion and abrasion protection for the substrates for example to provide a mask for selectively etching a substrate. Polybutylene such as DP2420 available from Shell Chemical Company, a division of Shell Oil Company is usable with this technique.

To create the unique coated articles, isotactic polybutylene, in powder form, can be sprayed onto various substrates using a propane flame without the need for an additional solvent. Flame spraying is accomplished by blowing a finely ground polybutylene through a flame and depositing it on the desired substrate, for example stainless steel or aluminum panel or rod. It is contemplated that other substrates can be used to prepare the unique flame coated articles. For example, it is possible that even polymer substrates, with melting point similar to or higher than the melting temperature of the coating polymer, could be used to prepare the unique coated articles.

The flame coated articles are preferably prepared with isotactic polybutylenes, including polybutylene homopolymers and copolymers. During flame coating, the face of the substrate can be heated to about 300° F. while the backside of the substrate should heat to less than 200° F.

The flame spraying is preferably performed at rates of 60–150 square feet per hour creating a 8–10 mil coating on the substrates. The flame coated articles can be modified by adding pigments or other stabilizers to the polybutylene polymer prior to the flame coating procedure.

The term "polybutylene" refers to polymers of butene-1 homopolymer and butene-1 copolymers such as butene-1-ethylene, butene-1-propylene, and butene-1-alpha olefins having from 5 to 8 carbon atoms.

Polybutylene polymers are composed of linear chain molecules with the regular and spacially ordered arrangement of ethyl side groups, the pendant groups that result when on butene is polymerized across the 1,2 carbon double bond along an ethylene chain backbone (U.S. Pat. No. 3,362,940. When cooled from melt, the ethyl side groups initially align in a tetragonal spatial arrangement, developing a little over one half of the ultimate crystallinity (form II). With time, the tetragonal crystalline phase transforms into a stable hexagonal spatial arrangement with subsequent development of additional crystallinity (form I). This is a very slow process, the transformation being completed in the neat polymer over a period of several days. This phase transformation produces some shrinkage of the polymer and results in stresses on the coating. In some cases where adhesion to the substrate is not strong the coating may delaminate.

By adding a nucleating agent, it has been found that the polybutylene coating does not shrink as quickly or as much. It is believed that the presence of the nucleating agent increases the nucleation density thereby decreasing the crystalline domain size and consequently the stresses produced during the phase transition.

Nucleating agents may include any nucleating agent which will increase the crystallization temperature of the polybutylene. Examples include high density polyethylene, polyethylene, nylon, alizarin, 1,8 naphthalimide, phthalimide, 1,5-dihydroxy-9,10-anthraquinone and fillers or pigments such as zinc oxide, titanium oxide or talc.

Butene-1 can be copolymerized with a variety of alpha-olefins to provide useful copolymers such as those taught in U.S. Pat. No. 3,362,940 which is herein incorporated by reference.

The adhesion of polybutylene to various substrates can be improved by incorporation of functionality into the chain by copolymerization or by grafting. Ethylene methacrylic acid copolymers and ethylene vinyl acetate copolymers are examples of such copolymers.

The flame spray process of the invention is usefully conducted employing the polybutylene composition without the addition of other materials. However, conventional additives such as antioxidants and stabilizers which are designed to improve the properties of the coated object may be incorporated within the polybutylene composition. In a particular embodiment, however, the polybutylene is blended with a second polymeric component and the resulting blend is employed in the flame coating process.

The method of forming a blend to be used in the process of the invention, is not material so long as a uniform blend of the components is produced without undue degradation of the components or the resulting blend. In one modification the polybutylene polymer and the additives are coextruded to produce the blend as an extrudate. In an alternative modification, the components are dry blended as powders or blended in a mixing device which exhibits high shear.

The blends used in the process of the invention may optionally contain other conventional additives such as antioxidants, stabilizers and fire retardant materials, and other additives designed to improve the processability of the polymers or improve the properties of the resulting blend. Such additives are added by conventional methods prior to, together with, or subsequent to the blending of the component polymers.

The general methods of flame spraying polymeric or other finely divided materials are known in the art. The basic concept of flame spraying of thermoplastic polymeric materials involves an apparatus wherein the polymeric material, a fuel and oxygen-containing gas are introduced into a combustion chamber wherein the fuel and oxygen-containing gas mixture ignites, thereby giving off heat which serves to substantially melt the polymeric material. The molten polymeric material is thereafter propelled from the combustion chamber by a source of propelling gas onto the surface of the object to be coated. An alternate modification of the process, also often termed flame spraying, although not directly involving a flame, employes the use of a heated wire or filament to melt the polymer to be sprayed. The use of the flame produced by combustion of a fuel in air is generally preferred.

Illustrative fuels are generally low-molecular weight hydrocarbons which ignite easily and are normally gaseous at ambient conditions. Examples of suitable fuels include propane, methane, butane, propylene, ethylene, and acetylene. As the oxygen-containing gas employed to cause combustion of the fuel, a variety of mixtures of oxygen and other non-combustible gases are usefully employed. Air is preferred. A variety of gaseous materials i useful as the propelling gas including nitrogen, argon, and helium. Largely for convenience and economy, the use of air as the propelling gas as well as the combustion gas is preferred. Examples of such flame spraying processes and apparatus therefor are known in the art. A particularly useful process and equipment for use in the process is described in Reimer, U.S. Pat. No. 4,632,309. Other related processes are illustrated by U.S. Pat. Nos. 4,604,306, 3,723,165, and 3,440,079.

In a representative embodiment of the process of the invention the polymeric material comprising the polybutylene polymer blended with adhesion promoters and nucleating agents, provided in a finely divided powder form, is mixed with propane fuel and air and passed to a combustion chamber where the fuel and air are ignited, thereby providing the energy required to substantially melt the polymeric material. The molten polymeric material is propelled from the combustion chamber and from the apparatus through the use of compressed air as a propelling carrier gas and is allowed to impact upon an object, which is to be coated. The target object, being relatively cool, will cause the molten polymer to solidify and thereby provide the coating.

The state of division of the polymeric material powder as well as the viscosity of the polybutylene polymer, is important in obtaining good coatings on the target object. The polymeric material to be flame sprayed should be of a size from about 20 mesh to about 100 mesh, preferably from about 50 mesh to about 80 mesh. The polymers to be flame sprayed are preferably ground to a small particle size using a cryogenic grinder. Isotactic polybutylene having a melt index from about 1 to about 1000 may be used in the process of the present invention. Preferably polybutylene should have a melt index of between about 45 and about 400 so that the coating will be useful and the spraying process itself will proceed smoothly.

The object to be coated is a solid object for which a tough, wear, and corrosion resistant coating is desired and objects of metal, glass, ceramic, plastic, or other material may be coated by the present process. More frequently, the process is employed to provide a coating of polybutylene or blend thereof on metal objects. The process of the invention may be used in conjunction with other polymeric coatings wherein the object to be coated has a based coat of a first polymeric composition, such as another polyolefin, and a subsequent top coat of polybutylene or polybutylene blend. Alteratively, the coating comprising polybutylene may be used to provide a base coat suitable for subsequent top coating with a second composition.

The invention is further illustrated by the following Illustrative Embodiments which should not be construed as limiting.

EXAMPLES

Isotactic polybutylene from Shell Chemical Company DP2420 with a melt flow of 20 was cryogenically ground to a particle size of about 70 mesh. The powder was dry blended with any additives and sprayed onto polished aluminum panels approximately 6 inches by 12 inches by 3/16 inch thick. The additives were adhesion promoters specifically ethylene methacryllic acid copolymer (EMAA) and ethylene vinyl acetate copolymer (EVA) and high density polyethylene (HDPE) or zinc oxide as nucleating agents. The plates were flame dried and heated to about 225° F. then coated by flame spraying until a uniform smooth coating was achieved. The results are summarized below.

The polybutylene was DP2420 available from Shell Chemical Co., Houston, Tex. The HDPE was Alathon F-7815 available from Oxy Petrochemicals. The zinc oxide was Kadox 911 with a mean particle size of 0.13 um maximum, available from Zinc Corporation of America. The ethylene methacrylic acid was Nucrel 535 available from Dupont. The components for each of the compositions for the Examples were extruded on a 1¼ inch extruder equipped with a mixing screw at 100 to 1 20RPM. The initial zone temperature was 100° C. and all other zones were at 175° C.

The blends used in Examples 2, 3 and 4 were analyzed on a Perkin Elmer 7 series thermal analyses system. The crystallization temperatures for the blends are shown below:

| Example | Crystallization Temperature |
|---|---|
| 2 | 69.4° C. |
| 3 | 74.1° C. |
| 4 | 71.8° C. |

EXAMPLE 1

Control

Pb2420 polybutylene with no adhesion promoter or nucleating agent was flame sprayed onto polished aluminum plates. The powder did not flow evenly during the flame spraying resulting in non-uniform coatings. The resulting coatings, immediately after coating, would peel off easily without tearing, indicating little or no adhesion and would spontaneously delaminate with 2–4 hours after coating.

EXAMPLE 2

A blend of PB2420 polybutylene with 10 wt % ethylene methacrylic acid copolymer was flame sprayed onto polished metal plates. The powder flow was good and the adhesion was good, however, the coating spontaneously delaminated after 2–4 hours.

EXAMPLE 3

A blend of PB2420 polybutylene with 10 wt % ethylene methacrylic acid copolymer, adhesion promoter, 0.5 wt % HDPE and 0.5 wt % zinc oxide nucleating agents were flame sprayed on polished aluminum as above. The blend had excellent flame spray characteristics with good powder flow behavior. The resulting coatings had good adhesion and did not delaminate for 24 to 96 hours after coating.

EXAMPLE 4

A blend of DP2420 polyubutylene with 10 wt % ethylene methacrylic acid copolymer adhesion promoter and 1.0 wt % HDPE and 0.5 wt % zinc oxide nucleating agents was flame sprayed as above. The blend had excellent flame spray characteristics with good flow behavior. The resulting coatings had good adhesion and did not delaminate for 24 to 96 hours after coating.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A process for coating a solid object with a polymeric material comprising heating a powdered polymeric material comprising a blend of a polybutylene homopolymer or copolymer with an adhesion promoter and a nucleating agent to substantially melt the polymeric material and thereafter propelling the substantially molten polymeric material by flame spraying onto the surface of the solid object, thereby forming a coating, wherein said powdered polymeric material has a particle size from about 20 mesh to about 100 mesh; and wherein the coated solid object has and exhibits improved delamination properties.

2. The process of claim 1 wherein the polybutylene copolymer is a butene-1/ethylene copolymer.

3. The process of claim 2 wherein the copolymer has between about 5 and 25 mole percent ethylene.

4. The process of claim 1 wherein the polybutylene has a melt index of between about 1 and 1000.

5. The process of claim 1 wherein the polybutylene has a melt index of between and about 45 and about 400.

6. The process of claim 1 wherein the adhesion promoter is ethylene methacrylic acid copolymer.

7. The process of claim 1 wherein the adhesion promoter is ethylene vinyl acetate copolymer.

8. The process of claim 1 wherein the adhesion promoter is present at from about 1 to about 35 percent by weight.

9. The process of claim 1 wherein the adhesion promoter is present at from about 5 to about 15 percent by weight.

10. The process of claim 1 wherein the adhesion promoter is present at about 10 percent by weight.

11. The process of claim 1 wherein the nucleating agent is high density polyethylene.

12. The process of claim 1 wherein the nucleating agent is zinc oxide.

13. The process of claim 1 wherein the substrate is heated to above 20020 F. before coating.

14. The process of claim 1 wherein the substrate is heated to above 225° F. before coating.

* * * * *